(12) United States Patent
Kuo et al.

(10) Patent No.: US 12,517,076 B2
(45) Date of Patent: Jan. 6, 2026

(54) GAS DETECTOR

(71) Applicant: INDUSTRIAL TECHNOLOGY RESEARCH INSTITUTE, Hsinchu (TW)

(72) Inventors: Pei-Chi Kuo, Tainan (TW); Bor-Shiun Lee, New Taipei (TW); Ming-Fa Chen, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 335 days.

(21) Appl. No.: 18/089,205

(22) Filed: Dec. 27, 2022

(65) Prior Publication Data

US 2024/0175836 A1     May 30, 2024

(30) Foreign Application Priority Data

Nov. 30, 2022   (TW) .................. 111145946

(51) Int. Cl.
| | | |
|---|---|---|
| *G01N 27/12* | (2006.01) | |
| *G01N 33/00* | (2006.01) | |
| *H05B 3/03* | (2006.01) | |

(52) U.S. Cl.
CPC ....... *G01N 27/122* (2013.01); *G01N 33/0027* (2013.01); *H05B 3/03* (2013.01)

(58) Field of Classification Search
CPC ...... B60L 3/0046; B60L 3/0053; B60L 58/30; B60L 58/33; B60L 58/34; B60L 58/40; G01R 31/12; G01R 31/36; H01M 16/003; H01M 8/04246; H01M 8/04552; H01M 8/04559; H01M 8/04567; H01M 8/04671; H01M 8/04679; H01M 8/04686; Y02E 60/50; Y02T 10/70; Y02T 90/40; G01N 27/121; G01N 27/122; G01N 33/0027; H05B 3/03
See application file for complete search history.

(56) References Cited

U.S. PATENT DOCUMENTS

| | | | |
|---|---|---|---|
| 8,293,179 B2 | 10/2012 | Kira | |
| 11,009,478 B2 * | 5/2021 | Hayashi | ............ G01N 27/124 |

(Continued)

FOREIGN PATENT DOCUMENTS

| | | |
|---|---|---|
| CN | 105181754 A | 12/2015 |
| CN | 205506741 U | 8/2016 |

(Continued)

OTHER PUBLICATIONS

Taiwan Office Action issued in corresponding application No. 111145946, dated Dec. 11, 2023.

(Continued)

*Primary Examiner* — Kristina M Deherrera
*Assistant Examiner* — Gedeon M Kidanu
(74) *Attorney, Agent, or Firm* — Maschoff Brennan

(57) ABSTRACT

A gas detector includes: a substrate, a heater, a first resistor and a second resistor. The heater is disposed on the substrate. The first resistor is disposed on the heater, and has a first resistance value associated with a target gas. The second resistor is connected in series with the first resistor and is disposed on the substrate, wherein the first resistor and the second resistor are formed in the same manufacturing process and in the same shape.

14 Claims, 5 Drawing Sheets

(56) References Cited

U.S. PATENT DOCUMENTS

| | | | |
|---|---|---|---|
| 2020/0278310 A1 | 9/2020 | Ninos et al. | |
| 2021/0003525 A1* | 1/2021 | Kaita | G01N 33/006 |
| 2021/0055273 A1* | 2/2021 | Jung | G01N 27/124 |
| 2021/0109053 A1* | 4/2021 | Shiraki | G06K 19/0723 |

FOREIGN PATENT DOCUMENTS

| | | | |
|---|---|---|---|
| CN | 207067047 U | | 3/2018 |
| CN | 111164419 A | | 5/2020 |
| CN | 111344561 A | | 6/2020 |
| CN | 112326751 A | | 2/2021 |
| EP | 3690432 A1 | | 8/2020 |
| JP | 2004177263 A | * | 6/2004 |
| JP | 2007232406 A | | 9/2007 |
| TW | 201721137 A | | 6/2017 |
| TW | I657250 B | | 4/2019 |

OTHER PUBLICATIONS

Xu et al. "A CMOS-MEMS Thermoresistive Micro Calorimetric Flow Sensor With Temperature Compensation" Oct. 2019.

Abdullah et al. "Correction Model for Metal Oxide Sensor Drift Caused by Ambient Temperature and Humidity" Mar. 2, 2022.

Gong et al. "Temperature feedback control for improving the stability of a semiconductor-metal-oxide (SMO) gas sensor" Feb. 2006.

* cited by examiner

GAS DETECTOR

CROSS-REFERENCE TO RELATED APPLICATIONS

This non-provisional application claims priority under 35 U.S.C. § 119(a) on Patent Application No(s). 111145946 filed in Republic of China (ROC) on Nov. 30, 2022, the entire contents of which are hereby incorporated by reference.

BACKGROUND

1. Technical Field

This disclosure relates to a gas detector, especially to a gas detector with calibration function.

2. Related Art

Gas detector is widely used in various fields, such as monitoring the concentration of carbon monoxide and carbon dioxide. However, since the atmosphere may easily have high humidity due to rainfall or water vapor, etc., the number of adsorption sites of the gas detector is easily reduced due to the adsorption of water vapor, thereby reducing the accuracy and stability of the gas detector. That is, for the same gas concentration, the measured values of the gas detector are different under different humidity, resulting in measurement errors, and at the same time causing the resistance value of the gas detector to drift relative to the baseline resistance value.

SUMMARY

According to one or more embodiment of this disclosure, a gas detector includes: a substrate; a heater disposed on the substrate; a first resistor disposed on the heater, having a first resistance value associated with a target gas; and a second resistor connected in series with the first resistor and disposed on the substrate, wherein the first resistor and the second resistor are formed in the same manufacturing process and in the same shape.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the disclosure. The following embodiments further illustrate various aspects of the disclosure, but are not meant to limit the scope of the disclosure.

Figure 1:
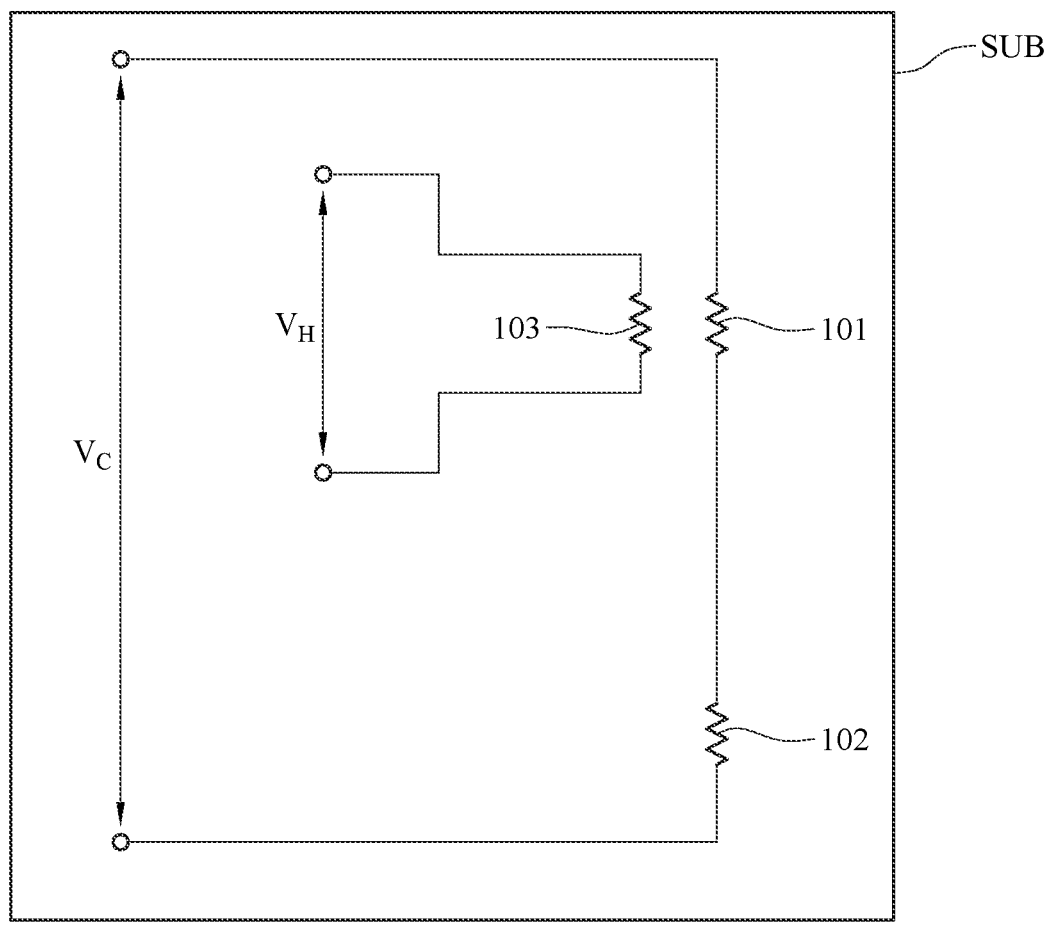
FIG. 1 is a circuit diagram illustrating a gas detector according to an embodiment of the disclosure.
Figure 2A:
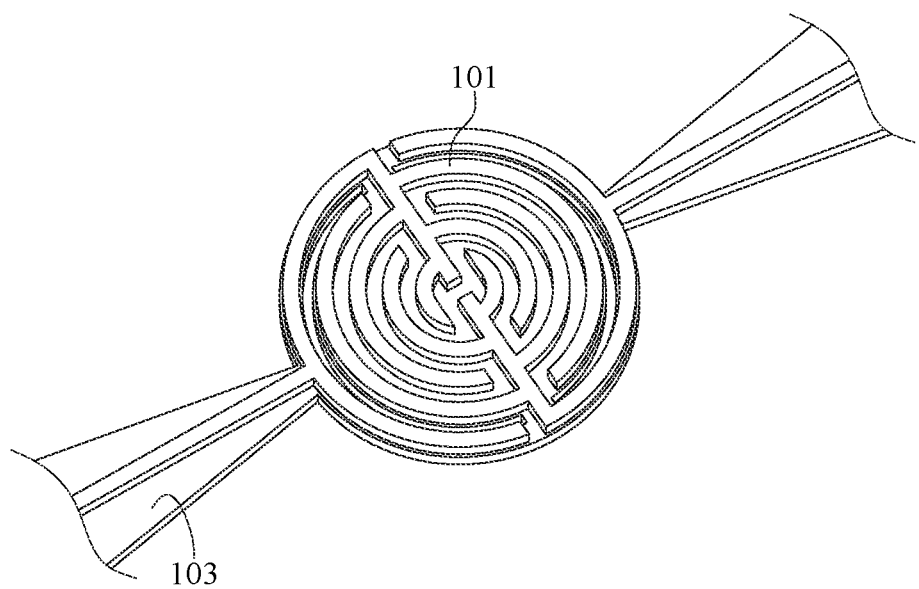
FIG. 2(a) is a schematic diagram illustrating a first resistor and a heater according to an embodiment of the disclosure.
Figure 2B:
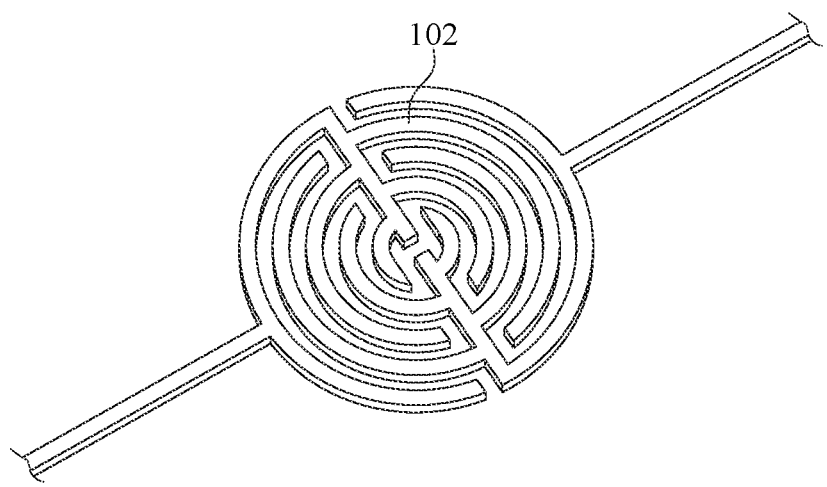
FIG. 2(b) is a schematic diagram illustrating a second resistor according to an embodiment of the disclosure.

Please refer to FIG. 1, FIG. 2(a) and FIG. 2(b), FIG. 1 is a circuit diagram illustrating a gas detector according to an embodiment of the disclosure; FIG. 2(a) is a schematic diagram illustrating a first resistor and a heater according to an embodiment of the disclosure; and FIG. 2(b) is a schematic diagram illustrating a second resistor according to an embodiment of the disclosure.

As shown in FIG. 1, the gas detector 1 includes a substrate SUB, a first resistor 101, a second resistor 102 and a heater 103. The first resistor 101, the second resistor 102 and the heater 103 are disposed on the substrate SUB, wherein the second resistor 102 is connected in series with the first resistor 101. The first resistor 101 and the second resistor 102 may be connected to a first power supply $V_C$ to receive electrical power, and the heater 103 may be connected to a second power supply $V_H$ to receive electrical power.

As shown in FIG. 2(a), the first resistor 101 is disposed on the heater 103 for the heater 103 to heat the first resistor 101, wherein the heater 103 may be implemented by heater resistor. The first resistor 101 has a first resistance value associated with a target gas, wherein said target gas may be carbon monoxide, carbon dioxide or nitrogen etc., the disclosure does not limit the types of the target gas.

Specifically, the heater 103 receives power from the second power supply $V_H$ to heat the first resistor 101 to a working temperature (for example, 200 degrees Celsius to 400 degrees Celsius). When gas molecules of the target gas are attached to the first resistor 101, the conductivity of the first resistor 101 changes in response to the attached gas molecules. In short, the first resistor 101 may be used to sense gas concentration corresponding to said gas molecules.

As shown in FIG. 2(b), the second resistor 102 may not be disposed with a corresponding heater resistor, and an electrical parameter value corresponding to the second resistor 102 (for example, cross voltage value (i.e. voltage across the second resistor 102) or current value) may be used to compensate resistance value change of the first resistor 101, thereby calibrating the gas concentration value. In short, the second resistor 102 may be used as humidity sensor or temperature sensor etc.

In addition, as shown in FIG. 2(a) and FIG. 2(b), the first resistor 101 and the second resistor 102 are formed in the same manufacturing process and in the same shape, but the disclosure does not limit the specific manufacturing process and specific shape of the first resistor 101 and the second resistor 102. Further, the first resistor 101 and the second resistor 102 may be formed in the same material. Each of the first resistor 101 and the second resistor 102 is a variable resistor. That is, resistance values of the first resistor and the second resistor vary with the environment. For example, the first resistor and the second resistor may be formed of sensing materials and electrodes, and their resistance values change with different environments. The first resistor 101 and the second resistor 102 shown in FIG. 2(a) and FIG. 2(b) have the same ring/circular shape, but the shape shown in FIG. 2(a) and FIG. 2(b) is merely an example, the disclosure is not limited thereto.

Through the above embodiments, the first resistor 101 and the second resistor 102 may be formed in the same manufacturing process without additional mask, thereby reducing the cost of the gas detector 1. The second resistor 102 may be used to compensate the resistance value change of the first resistor 101, thereby calibrating gas concentration value generated by the gas detector 1. In addition, since the first resistor 101 and the second resistor 102 have the same element characteristics (same material and same shape), the first resistor 101 and the second resistor 102 have similar aging process, drifting of gas concentration value generated by the gas detector 1 due to the aging of the gas detector 1 may be alleviated.

Figure 3:
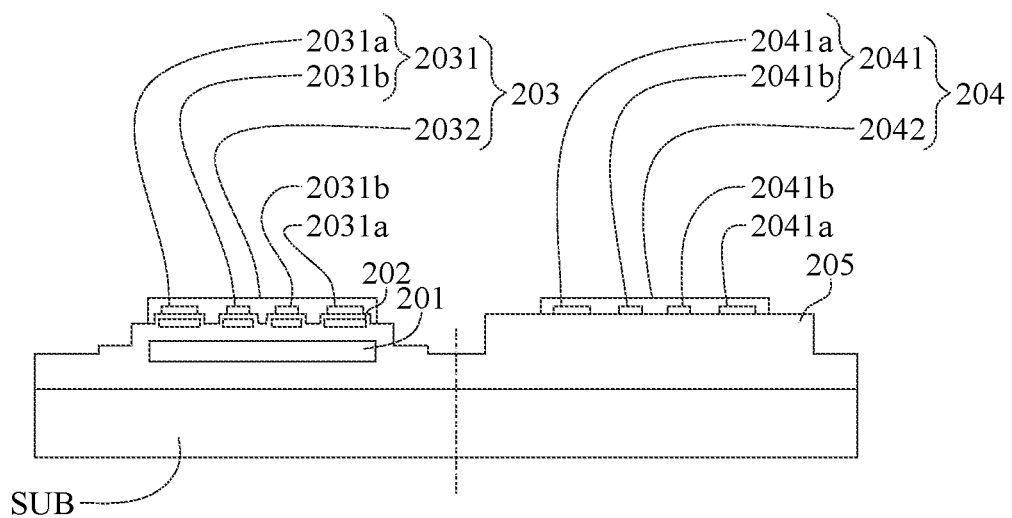
FIG. 3 is a schematic diagram illustrating a stacked structure of a gas detector according to another embodiment of the disclosure.

Please refer to FIG. 1 and FIG. 3, wherein FIG. 3 is a schematic diagram illustrating a stacked structure of a gas detector according to another embodiment of the disclosure.

As shown in FIG. 3, the gas detector 2 may include a substrate SUB, an insulation cavity 201, a heater 202, a first resistor 203 and second resistor 204 that are sequentially stacked. The heater 204 may be the same as the heater 103 shown in FIG. 1 and FIG. 2(a), and the description of the heater 204 is not repeated herein.

The gas detector 2 may further include a thin film structure 205, wherein the thin film structure 205 may include insulating material, and the insulating material is formed to wrap the insulation cavity 201 and the heater 202. That is, the heater 202 may be disposed inside the thin film structure 205. As shown in FIG. 3, the thin film structure 205 is disposed between the first resistor 203 and the substrate SUB, and between the second resistor 204 and the substrate SUB. An insulation layer formed of the thin film structure 205 may be disposed between the heater 202 and the first resistor 203 to avoid a direct conductive contact between the heater 202 and the first resistor 203.

The thin film structure 205 includes the insulation cavity 201, and the insulation cavity 201 is between the first resistor 203 and the substrate SUB to avoid heat generated by the heater 202 to be conducted to the substrate SUB. Further, the insulation cavity 201 may be located between the heater 202 and the substrate SUB, the disclosure is not limited thereto.

The first resistor 203 includes a first electrode 2031 and a first sensing material 2032, and the second resistor 204 includes a second electrode 2041 and a second sensing material 2042. The first electrode 2031 and the second electrode 2041 are interdigitated electrodes, and the first electrode 2031 and the second electrode 2041 have the same shape, same area, and may be formed in the same manufacturing process at the same time. The first electrode 2031 has a first positive electrode part 2031a and a first negative electrode part 2031b, and the first positive electrode part 2031a and the first negative electrode part 2031b have a first spacing therebetween. The second electrode 2041 has a second positive electrode part 2041a and a second negative electrode part 2041b, and the second positive electrode part 2041a and the second negative electrode part 2041b have a second spacing therebetween. The first spacing is equal to the second spacing. The first sensing material 2032 may be formed on the first electrode 2031 to cover the first electrode 2031, and the second sensing material 2042 may be formed on the second electrode 2041 to cover the second electrode 2041. The first sensing material 2032 and the second sensing material 2042 are formed from same material. The first sensing material 2032 and the second sensing material 2042 both are sensing metal, such as tin oxide ($SnO_2$) or tungsten oxide ($WO_3$), the disclosure is not limited thereto. That is, the first sensing material 2032 is same to the second sensing material 2042. In another embodiment, one of the first sensing material 2032 and the second sensing material 2042 is $SnO_2$, and the other is $WO_3$. In addition, the first sensing material 2032 and the second sensing material 2042 may be formed on the first electrode 2031 and the second electrode 2041, respectively, through the same manufacturing process. It should be noted that, the first positive electrode part 2031a and the first negative electrode part 2031b shown in FIG. 3 are merely examples, locations of the first positive electrode part 2031a and the first negative electrode part 2031b may be interchangeable; and the second positive electrode part 2041a and the second negative electrode part 2041b FIG. 3 are merely examples, locations of the second positive electrode part 2041a and the second negative electrode part 2041b may be interchangeable.

In addition, as shown in FIG. 3, the first resistor 203 and the second resistor 204 are disposed on the thin film structure 205. Heights of the first resistor 203 and the second resistor 204 on the thin film structure 205 may be same as each other. That is, a distance between the first resistor 203 and the substrate SUB is the same as a distance between the second resistor 204 and the substrate SUB. Further, an area covered by the first electrode 2031 of the first resistor 203 does not extend beyond the heater 204. That is, a projection of the first electrode 2031 on the substrate SUB is completely within (does not exceed) a projection of the heater 204 on the substrate SUB, wherein said projection is, for example, a projection along a stack direction. In other words, the projection of the heater 204 on the substrate SUB covers the projection of the first electrode 2031 on the substrate SUB.

Figure 4:
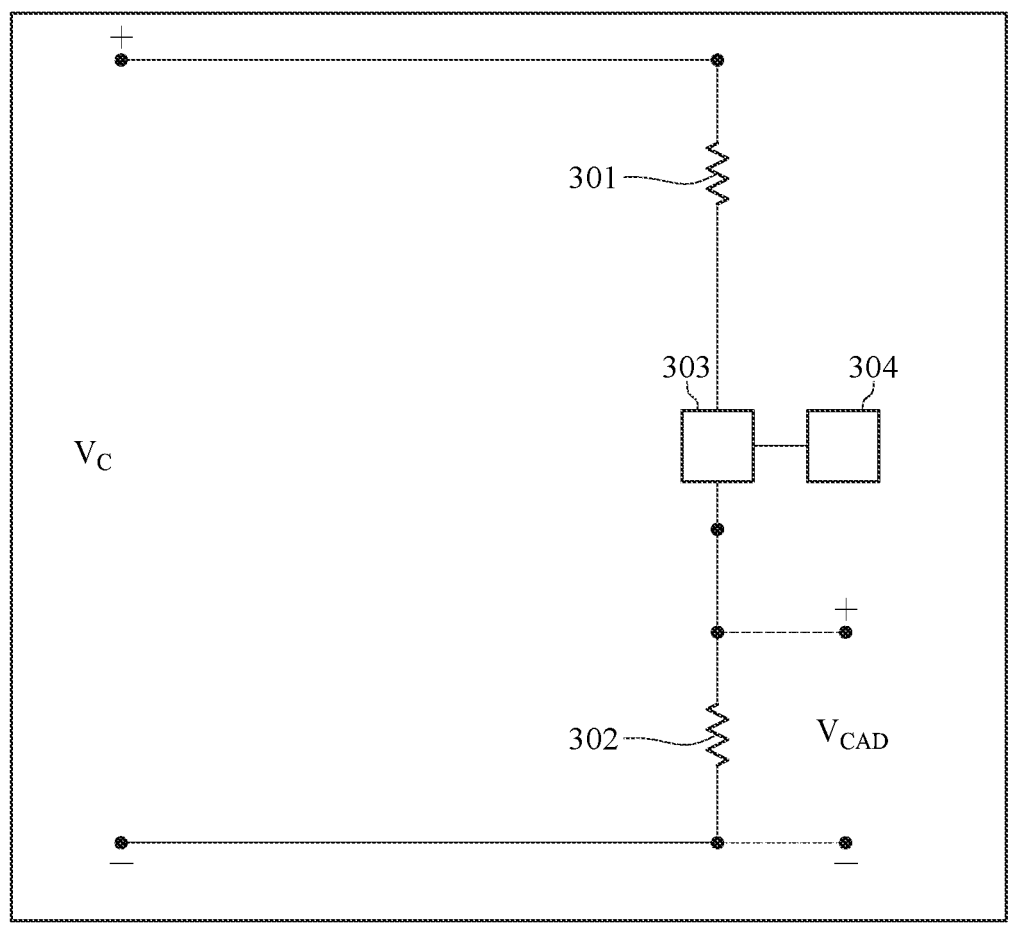
FIG. 4 is a circuit diagram illustrating a gas detector according to yet another embodiment of the disclosure.

Please refer to FIG. 4, FIG. 4 is a circuit diagram illustrating a gas detector according to yet another embodiment of the disclosure. The gas detector 3 includes a first resistor 301, a second resistor 302, a readout module 303 and a computing module 304, wherein the first resistor 301 and the second resistor 302 may be the same as the first resistor 101 and the second resistor 102 shown in FIG. 1, respectively. The gas detector 3 shown in FIG. 4 may be similar to the gas detector 1 shown in FIG. 1 or the gas detector 2 shown in FIG. 2, the difference lies in that, the gas detector 3 further includes the readout module 303 and the computing module 304.

As shown in FIG. 4, the readout module 303 is connected in series with the first resistor 301, and the readout module 303 is configured to measure the electrical parameter value of the second resistor 302. For example, the readout module 303 may include an ampere meter, and the electrical parameter value may include current value. The readout module 303 may also include a voltage meter connected in series with the first resistor 301 and connected in parallel with the second resistor 302, and the electrical parameter value may include the cross voltage value $V_{ADC}$ of the second resistor 302 (voltage across the second resistor 302), wherein the cross voltage value $V_{ADC}$ is a value obtained by performing analog to digital conversion on the voltage of the second resistor 302, and is a value obtained by the second electrode of the second resistor 302 (for example, the second electrode 2041 shown in FIG. 3) and the readout module 303 performing measurement and calculation. The cross voltage value $V_{ADC}$ may be used to calculate the first resistance value of the first resistor 301. The computing module 304 may include one or more processors, wherein the processor may be a central processing unit (CPU), a graphics processing unit (GPU), a microprocessor, a programmable logic controller or any other processor with signal processing functions. The computing module 304 is connected to the readout module 303, and the computing module 304 may calculate the ambient humidity value based on the electrical parameter value of the second resistor 302, thereby compensating the gas concentration value corresponding to the first resistor 301.

Furthermore, the computing module 304 may calculate the compensated first resistance value of the first resistor 301 through the following equation (1) or equation (2):

$$V_{ADC} = \frac{R_L}{R_S + R_L} \times V_C \quad \text{[equation (1)]}$$

$$R_S = \frac{R_L}{V_{ADC}} \times V_C - R_L \quad \text{[equation (2)]}$$

wherein $V_{ADC}$ is the cross voltage value of the second resistor 302; $R_L$ is the initial resistance value (a known resistance value) of the second resistor 302, and the computing module 304 may pre-store the initial resistance value of the second resistor 302; $R_S$ is the first resistance value of the first resistor 301; $V_C$ is the total voltage value of the first power supply $V_C$ described above.

Take the readout module 303 being the voltage meter for example, assuming that the total voltage value $V_C$ is 3.3V, the initial resistance value $R_L$ of the second resistor 302 is 1000KΩ, and the cross voltage value $V_{ADC}$ of the second resistor 302 measured by the readout module 303 is 1.9V, and then the first resistance value $R_S$ of the first resistor 301 obtained by the computing module 304 through equation (1) or equation (2) is approximately 736.84K(Ω). The first resistance value $R_S$ is the value compensated by the ambient humidity value generated by the second resistor 302, and may be used to calculate the gas concentration value.

In another embodiment, the computing module 304 may also include the readout module 303, and the computing module 304 is directly connected in series with the second resistor 302. Therefore, the computing module 304 may directly calculate the first resistance value of the first resistor 301 based on the initial resistance value of the second resistor 302, the cross voltage value and the total voltage value of the first power supply $V_C$.

Figure 5A:
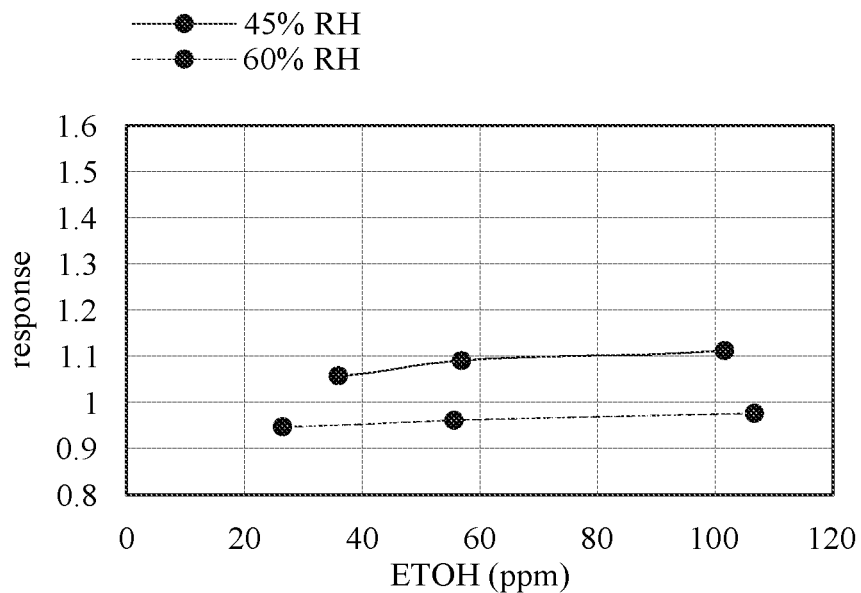
FIG. 5(a) illustrates the drifting of the sensing value of a conventional gas detector due to humidity.
Figure 5B:
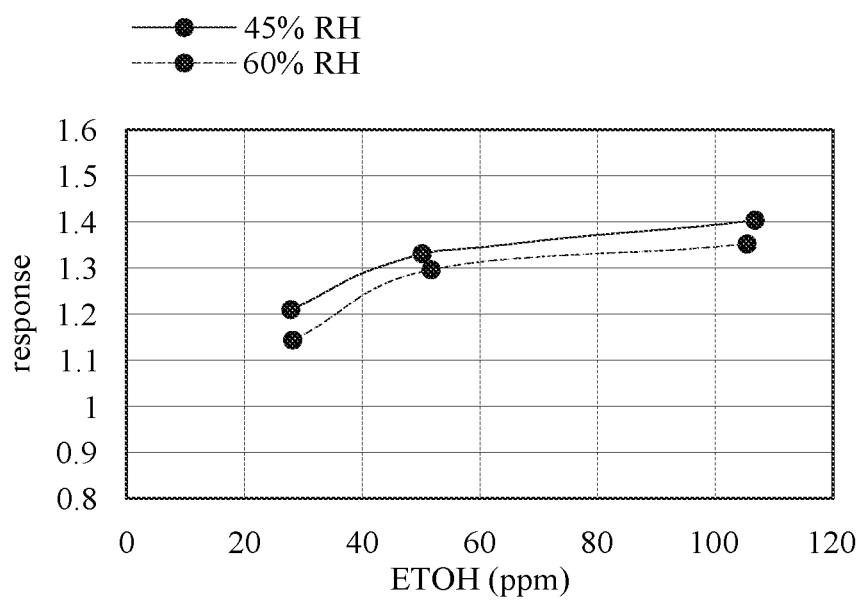
FIG. 5(b) illustrates the drifting of the sensing value of the gas detector of the disclosure due to humidity.

Please refer to FIG. 5(a) and FIG. 5(b), wherein FIG. 5(a) illustrates the drifting of the sensing value of a conventional gas detector due to humidity; and FIG. 5(b) illustrates the drifting of the sensing value of the gas detector of the disclosure due to humidity. FIG. 5(a) and FIG. 5(b) are results of using 45% of relative humidity (RH) and 60% RH for experiments, and the gas type of the subject (target gas) of the experiment is ethanol (ETOH). It can be seen from FIG. 5(a) and FIG. 5(b) that, when the humidity increases, response of the gas detector decreases. Said response may be defined through the following equation (3):

$$R_{res} = \frac{R_{ETOH} - R_{air}}{R_{air}} \quad \text{[equation (3)]}$$

wherein $R_{res}$ is the response; $R_{air}$ is the resistance value when the first resistor is not in contact with air; $R_{ETOH}$ is the resistance value when the first resistor is in contact with ETOH gas.

In the example of FIG. 5(a), RH rises from 45% to 60%, and the response drifting of the gas detector is around 10% to 12% (spacing between the 45% RH curve and 60% RH curve). In the example of FIG. 5(b), RH rises from 45% to 60%, and the response drifting of the gas detector is around 2% to 5% (spacing between the 45% RH curve and 60% RH curve). Based on the examples of FIG. 5(a) and FIG. 5(b), the amount of drifting of the gas detector of the disclosure is lower than the amount of drifting of conventional gas detector. Therefore, the gas detector of the disclosure may effectively avoid the gas detector from being impacted by humidity and avoid the problem of inaccurate readout values of gas concentration.

In addition, assuming that the increase of RH causes the first resistance value of the first resistor to decrease, for conventional gas detector, the initial resistance value of the second resistor is a constant value, which is likely to cause the increase of the readout value of gas concentration because the resistor without a corresponding heater of conventional gas detector is only made of metal material. On the contrary, since the second resistor and the first resistor of the gas detector of the disclosure is made of the same material and have the same shape (i.e. the second resistor of the disclosure is made of sensing material and electrode, just like the first resistor), when the increase of RH causes the first resistance value of the first resistor to decrease, the increase of the readout value of gas concentration may be voided, or the increase amplitude of the readout value of gas concentration may be reduced.

Through the above structure, the gas detector of the disclosure has functions of automatic compensation and calibration of readout values of gas concentration, thereby avoiding the reading error of the gas detector due to the influence of ambient humidity, and alleviating the drifting of gas concentration caused by the aging of the gas detector. In addition, since the first resistor and the second resistor of the gas detector of the disclosure are formed from same manufacturing process and have the same shape, no additional resistors and additional masks are required, which may reduce the manufacturing cost of the gas detector. Further, no additional impedance matching process is required.

What is claimed is:

1. A gas detector, comprising:
a substrate;
a heater disposed on the substrate;
a first resistor disposed on the heater, and having a first resistance value associated with a target gas, wherein the first resistor comprises a first electrode, a projection range of the first electrode on the substrate is located within a projection range of the heater on the substrate, and the projection range of the first electrode on the substrate is smaller than the projection range of the heater on the substrate, and wherein there is no cavity between the first electrode and the heater; and
a second resistor connected in series with the first resistor and disposed on the substrate,
wherein the first resistor and the second resistor are formed in the same manufacturing process and in the same shape.

2. The gas detector according to claim 1, wherein the second resistor comprises a second electrode, a positive electrode part and a negative electrode part of the first electrode has a first spacing therebetween, a positive electrode part and a negative electrode part of the second electrode has a second spacing therebetween, and the first spacing is equal to the second spacing.

3. The gas detector according to claim 1, further comprising a readout module connected in series with the first resistor, and the readout module is configured to measure an electrical parameter value of the second resistor.

4. The gas detector according to claim 3, further comprising a computing module connected to the readout module, wherein the computing module is configured to calculate an ambient humidity value based on the electrical parameter value of the second resistor.

5. The gas detector according to claim 1, further comprising a computing module connected to the second resistor, wherein the computing module is configured to calculate the first resistance value based on an initial resistance value of the second resistor and a cross voltage value of the second resistor.

6. The gas detector according to claim 5, wherein the first resistor and the second resistor are connected to a power supply, and the computing module calculates the first resistance value based on a total voltage value of the power supply, the initial resistance value and the cross voltage value.

7. The gas detector according to claim 1, wherein each of the first resistor and the second resistor is a variable resistor.

8. The gas detector according to claim 1, further comprising an insulation layer disposed between the heater and the first resistor.

9. The gas detector according to claim 1, wherein the first resistor further comprises a first sensing material, the second resistor comprises a second sensing material and a second electrode, the first sensing material covers the first electrode, and the second sensing material covers the second electrode.

10. The gas detector according to claim 9, wherein the first sensing material is same to the second sensing material.

11. The gas detector according to claim 9, wherein the first sensing material and the second sensing material are sensing metal.

12. The gas detector according to claim 9, wherein the first electrode and the second electrode are formed from same material.

13. The gas detector according to claim 1, further comprising a thin film structure disposed between the first resistor and the substrate, and disposed between the second resistor and the substrate, wherein the thin film structure comprises an insulation cavity, and the insulation cavity is located between the heater and the substrate.

14. The gas detector according to claim 13, wherein the heater is disposed inside the thin film structure.

* * * * *